(12) United States Patent
Nakano

(10) Patent No.: US 6,542,542 B1
(45) Date of Patent: Apr. 1, 2003

(54) I PICTURE SEARCH APPARATUS AND METHOD

(75) Inventor: Hirotaka Nakano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/493,578

(22) Filed: Jan. 28, 2000

(30) Foreign Application Priority Data

Jan. 29, 1999 (JP) .......................................... 11-022320

(51) Int. Cl.[7] ................................................ H04N 7/12
(52) U.S. Cl. ................................... 375/240.01; 386/68
(58) Field of Search ..................... 375/240.01, 240.12, 375/240.17; 386/33, 46, 68–70, 81, 82, 109, 111, 116; H04N 7/12, 7/32

(56) References Cited

U.S. PATENT DOCUMENTS

| | | | | |
|---|---|---|---|---|
| 5,510,899 A | * | 4/1996 | Kim | 386/69 |
| 5,675,693 A | * | 10/1997 | Kagoshima | 386/68 |
| 5,812,735 A | * | 9/1998 | Wada | 386/81 |
| 5,978,543 A | * | 11/1999 | Nishimura et al. | 386/111 |
| 5,991,502 A | * | 11/1999 | Kawakami et al. | 386/109 |
| 6,057,832 A | * | 5/2000 | Lev et al. | 386/68 |
| 6,081,649 A | * | 6/2000 | Asamura et al. | 386/111 |
| 6,169,846 B1 | * | 1/2001 | Ohishi | 386/81 |
| 6,266,373 B1 | * | 7/2001 | Bakhmutsky et al. | 375/240.17 |

FOREIGN PATENT DOCUMENTS

| | | |
|---|---|---|
| JP | H7-67067 | 3/1995 |
| JP | H7-123356 | 5/1995 |
| JP | 7-193785 | 7/1995 |
| JP | H7-226916 | 8/1995 |
| JP | H8-172603 | 7/1996 |
| JP | H8-195934 | 7/1996 |

* cited by examiner

Primary Examiner—Richard Lee
(74) Attorney, Agent, or Firm—Scully, Scott, Murphy & Presser

(57) ABSTRACT

The MPEG video data stored in a video memory is successively written to a buffer 14 in accordance with an address held in an address register 2. When I picture is detected from the data read from the buffer, the information is fed to an I picture interval holder 18. The I picture interval holder 18 holds an address register value when the previous I picture is detected, subtracts the previous address register value from the present address register value when the present I picture is detected, and holds the value (interval between the previous I picture address and the present I picture address). A next I picture address calculator 17 adds the interval obtained in the I picture interval holder 18 to the present address value stored in the address register 12, subtracts a predetermined value from the calculated value, and predicts the next I picture address.

15 Claims, 4 Drawing Sheets

I PICTURE SEARCH APPARATUS AND METHOD

BACKGROUND OF THE INVENTION

1. Field of the Invention

The present invention relates to a moving picture experts group (MPEG) system, particularly to a technique of searching I picture of MPEG data at a high speed.

2. Description of the Related Art

In the MPEG system for compressing and transmitting image information, the image information are mixed and transmitted as three types of image data: I picture; P picture; and B picture. Here, the I picture indicates an intra-frame coded image, and one frame can be reconstructed singly with the information, without requiring other frame information for deciding the image. The P picture indicates an inter-frame forward direction predictive coded image, and the information of earlier I picture of P picture is necessary for decoding the image. The B picture indicates an inter-frame bi-directional predictive coded image, and the information of earlier and later I picture of P picture is necessary for decoding the image.

FIG. 3 shows the layer structure of MPEG video data. In FIG. 3, a sequence layer indicates a topmost layer, and a group of picture (GOP) constituted by disposing the I picture on the top and also setting P and B pictures, and a sequence header (SH) indicating header information for controlling each GOP are alternately arranged. Moreover, in the subsequent GOP layer, various pictures constituting each GOP are arranged.

In the image playback of the MPEG system, when quick forwarding, or another special playback is performed, the above-described fact that one frame can be regenerated with the I picture alone is utilized, and a method comprising skipping the P and B pictures in a data stream and extracting and regenerating only the I pictures is performed.

However, in the MPEG system, since an information compression ratio differs with the frames, I picture intervals are not constant. Specifically, intervals X1, X2, and X3 to the next I picture shown in FIG. 3 are not constant.

Therefore, in order to extract the I pictures from the MPEG video data, a method comprising searching all the data to extract the I pictures has heretofore been used. The conventional I picture search method will be described hereinafter.

First, a method of decoding/processing the MPEG video data during the quick forwarding playback will be described. FIG. 4 is a block diagram showing the configuration of a decoding processor of the MPEG video data.

An I picture searcher 101 extracts I picture data from the MPEG video data. The extracted I picture data is subjected to variable length decoding in a variable length decoder (VLD) 102, and inversely quantized in an inverse quantizing unit 103, and an inverse discrete cosine transformer (IDCT) 104 performs an inverse discrete cosine transform to convert a frequency area to a space area, so that original image data is regenerated.

The details of the I picture searcher will next be described. FIG. 1 is a block diagram showing the configuration of a conventional I picture search apparatus.

The MPEG video data accumulated in a video memory 1 is successively written to a buffer 4 in accordance with an address supplied from an address register 2. The data read from the buffer 4 at a predetermined timing is compared with a specific bit pattern corresponding to the I picture in an I picture detector 5 to determine whether or not the data is I picture. As a determination result, when the data is the I picture, the data is outputted from a data output unit 6.

In this case, an address controller 3 increments the address by the amount of read data, generates the next data address, and stores the address in the address register 2, so that the I pictures are successively searched.

As described above, even when only the I picture data is necessary, the conventional I picture search method comprises successively reading all the picture data in the MPEG video data and checking whether or not the data is the I picture to extract the I pictures.

However, it requires a remarkably long processing time to check all the picture data constituting the MPEG video data in order to extract the I pictures from the MPEG video data, and a problem occurs that the processing is inefficient.

The present invention has been described in consideration of the above-described situation, and an object thereof is to provide an I picture search apparatus of MPEG data in which a processing of extracting I pictures from MPEG video data can be speeded up.

SUMMARY OF THE INVENTION

The MPEG video data stored in a video memory is successively written to a buffer in accordance with an address held in an address register. When I picture is detected from the data read from the buffer, the information is fed to an I picture interval holder. The I picture interval holder holds an address register value when the previous I picture is detected, subtracts the previous address register value from the present address register value when the present I picture is detected, and holds the value (interval between the previous I picture address and the present I picture address). A next I picture address calculator adds the interval obtained in the I picture interval holder to the present address value stored in the address register, subtracts a predetermined value from the calculated value, and predicts the next I picture address.

Therefore, since the I picture can be extracted from the MPEG video data without searching all the data in the MPEG video data, the processing of extracting the I picture from the MPEG video data can be speeded up.

DETAILED DESCRIPTION OF THE PREFERRED EMBODIMENTS

An embodiment of the present invention will be described hereinafter with reference to the drawings. The description will be concretely performed using the embodiment.

Figure 1:
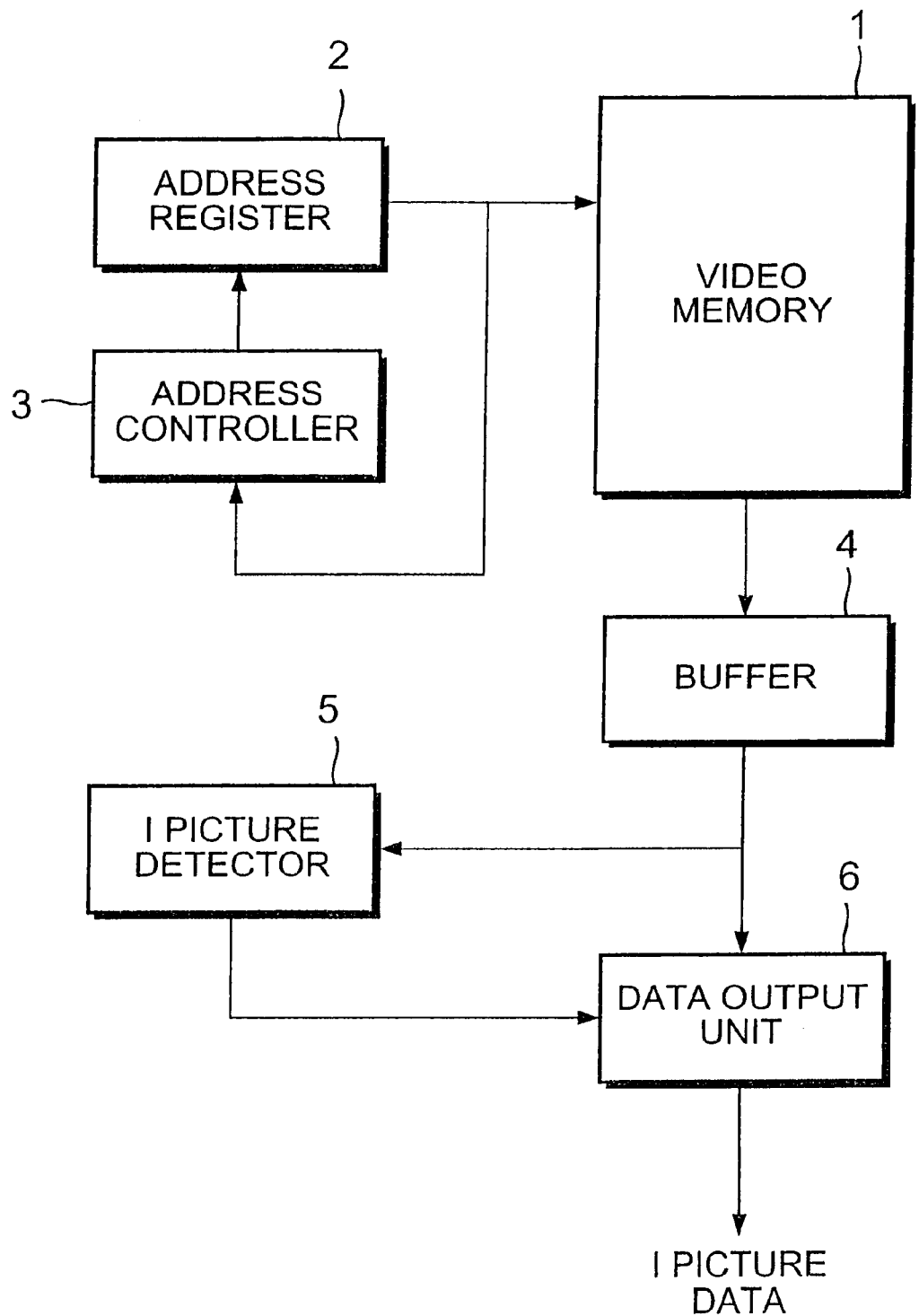
FIG. 1 is a block diagram showing the configuration of a conventional I picture search apparatus.
Figure 2:
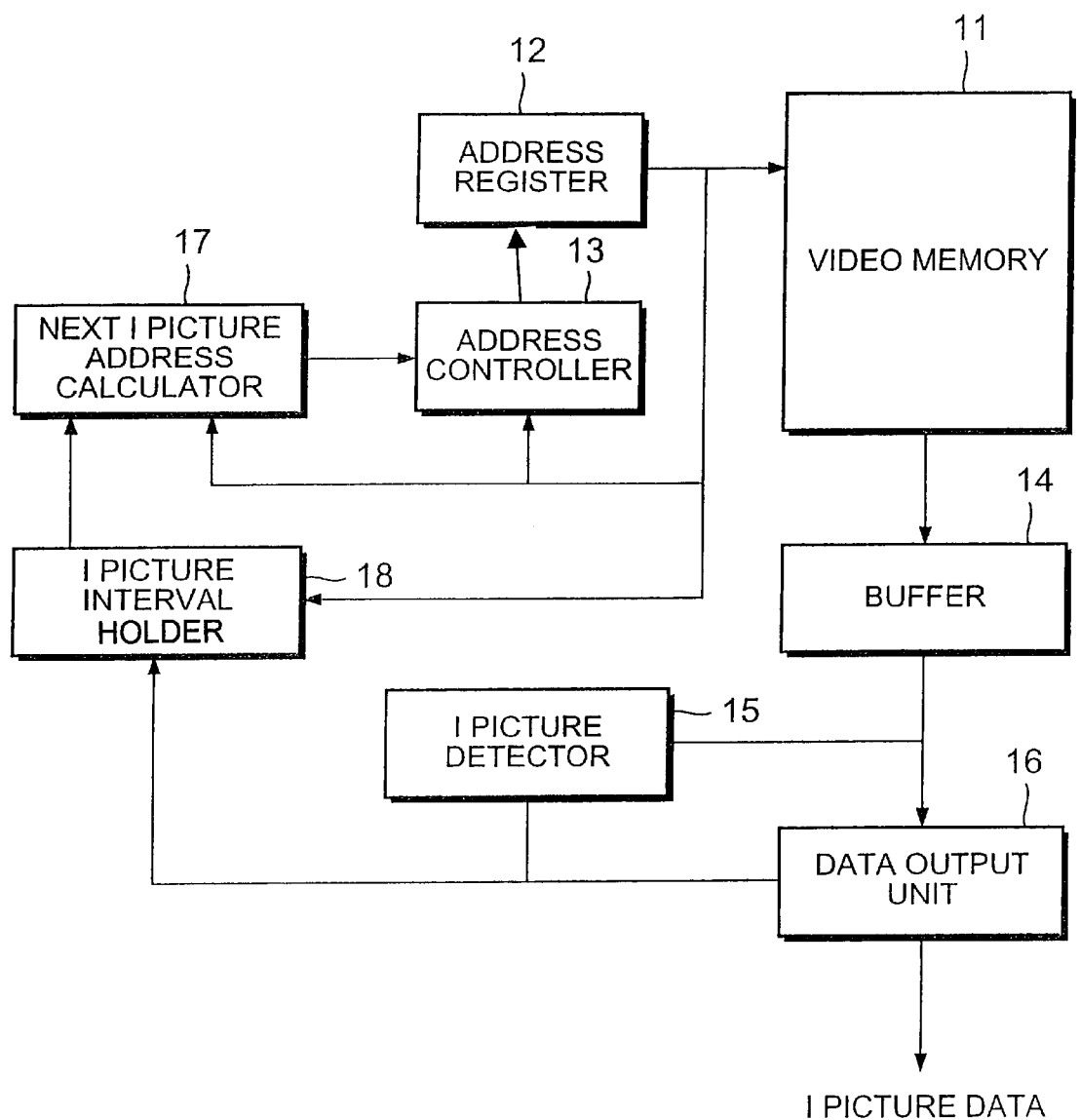
FIG. 2 is a block diagram showing the configuration of an I picture search apparatus of MPEG data according to one embodiment of the present invention.
Figure 3:
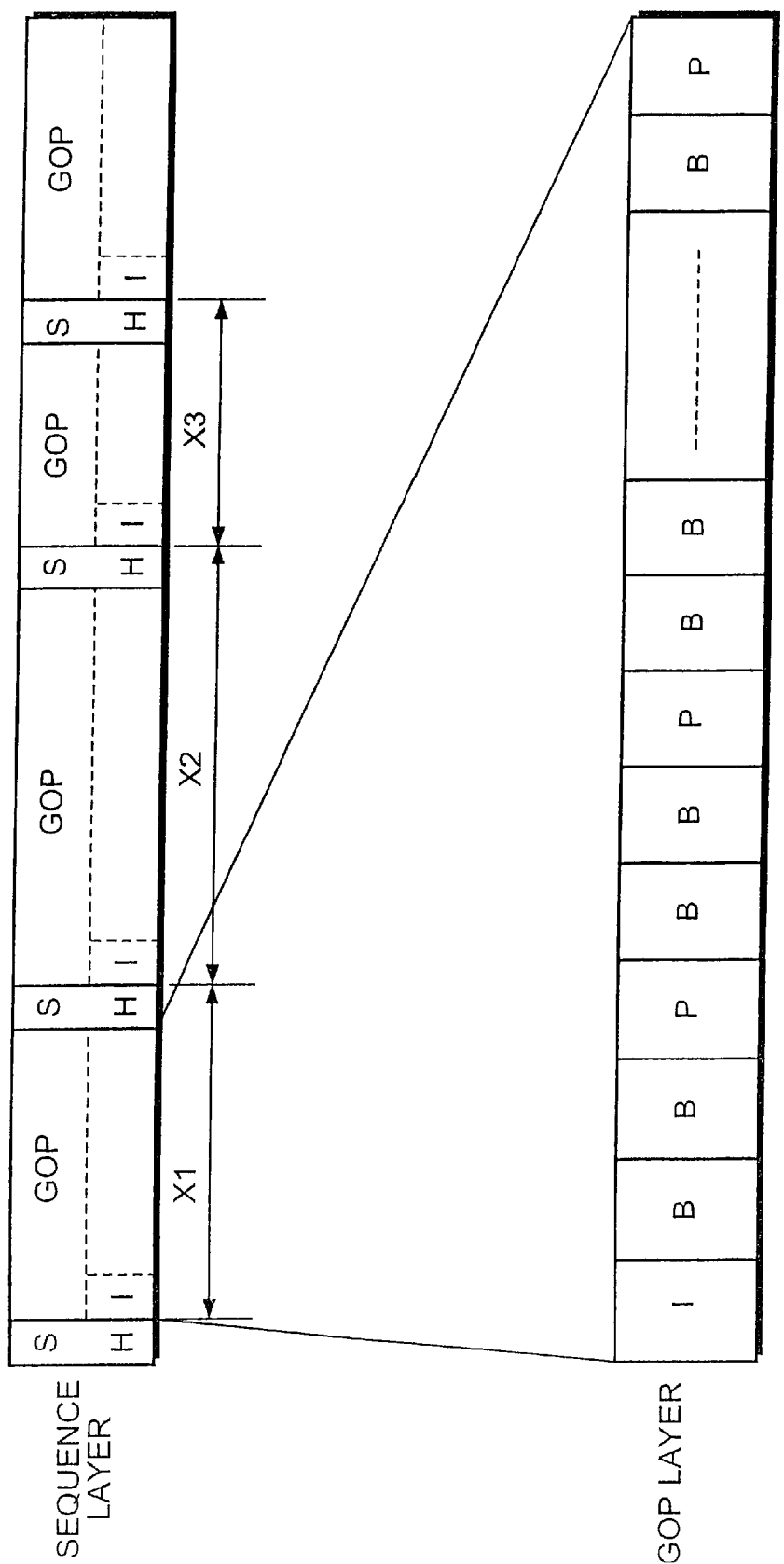
FIG. 3 is a diagram showing the layer structure of MPEG video data.
Figure 4:
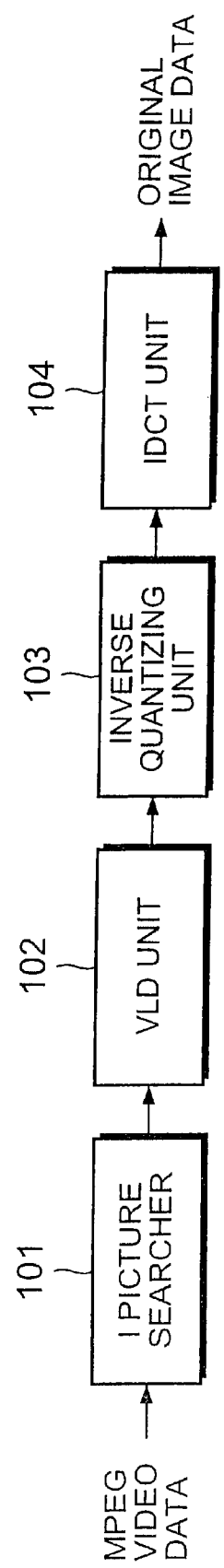
FIG. 4 is a block diagram showing the configuration of a decoding processor of MPEG video data.

FIG. 2 is a block diagram showing the configuration of an I picture search apparatus of MPEG data according to one embodiment of the present invention.

As shown in FIG. 2, this I picture search apparatus is roughly constituted of a video memory 11, an address register 12, an address controller 13, a buffer 14, an I picture detector 15, a data output unit 16, a next I picture address calculator 17, and an I picture interval holder 18.

The video memory 11 is constituted of a random access memory (RAM), a digital video disk (DVD), and the like, and stores MPEG video data. The address register 12 holds an address for reading data from the video memory 11, and supplies the address to the video memory 11. The address controller 13 controls the address to be supplied to the video memory 11 via the address register 12. The buffer 14 temporarily holds the data read from the video memory 11, and outputs the data at a predetermined timing.

The I picture detector 15 detects the I picture from the data read from the buffer 14. When I picture is detected in the I picture detector 15, the data output unit 16 outputs the picture as I picture data. The next I picture address calculator 17 calculates the predicted value of the next I picture address from the present address stored in the address register 12, an I picture interval obtained by the I picture interval holder 18 and a predetermined value. The I picture interval holder 18 obtains the I picture interval from a difference between the previous I picture address and the present I picture address, and holds the present I picture address.

An operation of this I picture search apparatus will next be described with reference to FIG. 2.

The MPEG video data stored in the video memory 11 is successively written to the buffer 14 in accordance with the address held in the address register 12. The data read from the buffer 14 at a predetermined timing is compared with a specific bit pattern indicating the I picture in the I picture detector 15 to determine whether or not the data is I picture. When it is determined that the data is the I picture, the data output unit 16 outputs the data as I picture data.

When the I picture is detected in the I picture detector 15, this information is also fed to the I picture interval holder 18. The I picture interval holder 18 holds the value of the address register 12 during the previous I picture detection, subtracts the previous value of the address register 12 from the present value of the address register 12 when the next I picture is detected, obtains the I picture interval from a difference value, and holds the present value of the address register 12 for the next time.

The next I picture address calculator 17 adds the I picture interval obtained in the I picture interval holder 18 to the present address value stored in the address register 12, subtracts the predetermined value from the calculated value, and transmits the predicted value of the next I picture address to the address controller 13.

Thus is because if the obtained I picture address intervals are simply added, and when the next I picture interval is short, the next picture address is possibly passed beyond.

In the address controller 13, in a usual method of incrementing the address by the read data amount from the I picture address predicted value obtained in the next I picture address calculator 17, the address is supplied to the address register 12, and control is performed to write the data to the buffer 14 from the video memory 11. When the I picture is detected from the data read from the buffer 14 in the I picture detector 15, and after I picture output is completed, a control of skipping to the next I picture address predicted value obtained in the next I picture address calculator 17 and incrementing the address is repeatedly performed.

The above-described predetermined value subtracted by the next I picture address calculator 17 can be obtained as follows. Specifically, simply, the value to be subtracted may be determined so that the next I picture address predicted value fails to go beyond the next I picture address even when the previous I picture interval is maximum and the next I picture interval is minimum.

However, the compression rate of the MPEG video data is variable, but in actual, by noting the fact that the compression rate does not rapidly change, and determining the value within the change range of the compression rate for each type of MPEG video data, the I picture can be searched more efficiently. Alternatively, this value may statically be obtained for each type of MPEG video data.

Furthermore, in another method, the predetermined value is set to a value which can be set from the outside, not to a constant value, so that the value can arbitrarily be changed in accordance with situations. In this method, by performing finer control, the wasteful search amount during I picture extraction can be minimized.

As described above, in the present I picture search apparatus, the I picture interval information in the past is used to predict the next I picture address, and the I picture search is performed. Without reading and analyzing all the data in the MPEG video data, the I picture can be searched. Therefore, the processing of extracting the I picture in the MPEG video data can be speeded up.

The embodiment of the present invention has been described above in detail with reference to the drawings, but the concrete constitution is not limited to this embodiment, and the present invention includes any design change without departing from the scope of the present invention. For example, the method of determining the next I picture interval in the I picture interval holder 18 is not limited to the method of obtaining the interval from the difference between two I picture addresses, and may include a determining method of using a counter to count the data amount between two I pictures.

As described above, according to the I picture search apparatus of the present invention, the I picture is searched and extracted from the MPEG video data by predicting the next I picture address in the MPEG video data without searching all the data, so that the processing of extracting the I picture from the MPEG video data can be speeded up, and the special playbacks such as the quick forwarding can be performed at a high speed.

What is claimed is:

1. An I picture search apparatus for detecting an I picture from compressed
    and encoded video data read from a memory for storing the compressed and encoded video data and reading the data in accordance with an address, wherein
    a next I picture address is predicted based on a difference between a previous I picture address and a present I picture address, and the reading address of said memory is generated from a predicted value until the reading of a next I picture is completed, wherein said predicted value is obtained by adding said difference to said present I picture address, then subtracting a predetermined value.

2. The I picture search apparatus according to claim 1, wherein said predetermined value is predetermined so that the predicted value of the next I picture address is smaller than a value of the next I picture address when a previous I picture interval is maximum, and a next I picture interval is minimum.

3. The I picture search apparatus according to claim 1, wherein said predetermined value is predetermined based on a compression rate of said compressed and encoded video data so that the predicted value of the next I picture address is smaller than a value of the next I picture address.

4. The I picture search apparatus according to claim 1, wherein said predetermined value is predetermined based on a statistic value determined for each type of said compressed and encoded video data so that the predicted value of the next I picture address is smaller than a value of the next I picture address.

5. The I picture search apparatus according to claim 1, wherein said predetermined value is set from an outside control panel so that the predicted value of the next I picture address is smaller than a value of the next I picture address.

6. An I picture search apparatus provided with an I picture detector for detecting an I picture from compressed and encoded video data read from a memory for storing the compressed and encoded video data and reading the data in accordance with an address, and a data output unit for extracting and outputting the I picture from the compressed and encoded video data read in response to the detection, comprising:

an I picture interval holder for obtaining an I picture interval between a previous I picture and a present I picture;

a next I picture address calculator for calculating a predicted value of a next I picture address from an address value of the present I picture and said I picture interval; and an address controller for generating the reading address of said memory from the address predicted value until the reading of the next I picture is completed, wherein said next I picture address calculator adds said I picture interval to the present I picture address value, and subtracts a predetermined value to obtain said next I picture address predicted value.

7. The I picture search apparatus according to claim 6, wherein said predetermined value is predetermined so that the predicted value of the next I picture address is smaller than a value of the next I picture address when a previous I picture interval is maximum, and a next I picture interval is minimum.

8. The I picture search apparatus according to claim 6, wherein said predetermined value is predetermined based on a compression rate of said compressed and encoded video data so that the predicted value of the next I picture address is smaller than a value of the next I picture address.

9. The I picture search apparatus according to claim 6, wherein said predetermined value is predetermined based on a statistical value determined for each type of said compressed and encoded video data so that the predicted value of the next I picture address is smaller than a value of the next I picture address.

10. The I picture search apparatus according to claim 6, wherein said predetermined value is set from an outside control panel so that the predicted value of the next I picture address is smaller than a value of the next I picture address.

11. An I picture search method of detecting an I picture from compressed and encoded video data read from a memory for storing the compressed and encoded video data and reading the data in accordance with an address, comprising the steps of:

predicting a next I picture address based on a difference between a previous I picture address and a present I picture address; and generating the reading address of said memory from a predicted value until the reading of a next I picture is completed, wherein said next I picture address is obtained by adding said difference to said present I picture address, and subtracting a predetermined value.

12. A The I picture search method according to claim 11, wherein said predetermined value is predetermined so that the predicted value of the next I picture address is smaller than a value of the next I picture address when a previous I picture interval is maximum, and a next I picture interval is minimum.

13. The I picture search method according to claim 11, wherein said predetermined value is predetermined based on a compression rate of said compressed and encoded video data so that the predicted value of the next I picture address is smaller than a value of the next I picture address.

14. The I picture search method according to claim 11, wherein said predetermined value is predetermined based on a statistical value determined for each type of said compressed and encoded video data so that the predicted value of the next I picture address is smaller than a value of the next I picture address.

15. The I picture search method according to claim 11, wherein said predetermined value is set from an outside control panel so that the predicted value of the next I picture address is smaller than a value of the next I picture address.

* * * * *